United States Patent
Hall et al.

(10) Patent No.: US 10,708,418 B2
(45) Date of Patent: Jul. 7, 2020

(54) SYSTEM AND METHOD FOR CONTACT IDENTIFICATION

(71) Applicant: Interactive Intelligence Group, Inc., Indianapolis, IN (US)

(72) Inventors: Michael W. Hall, Indianapolis, IN (US); Kevin Elliott King, Indianapolis, IN (US); Jon C. Melnik, Indianapolis, IN (US)

(*) Notice: Subject to any disclaimer, the term of this patent is extended or adjusted under 35 U.S.C. 154(b) by 26 days.

(21) Appl. No.: 15/676,821

(22) Filed: Aug. 14, 2017

(65) Prior Publication Data

US 2018/0048763 A1   Feb. 15, 2018

Related U.S. Application Data

(60) Provisional application No. 62/374,138, filed on Aug. 12, 2016.

(51) Int. Cl.
| | |
|---|---|
| *H04M 3/42* | (2006.01) |
| *H04Q 3/62* | (2006.01) |
| *H04Q 3/66* | (2006.01) |
| *H04L 29/06* | (2006.01) |
| *H04L 12/725* | (2013.01) |
| *H04M 7/12* | (2006.01) |

(52) U.S. Cl.
CPC .......... *H04M 3/42102* (2013.01); *H04Q 3/62* (2013.01); *H04Q 3/66* (2013.01); *H04L 45/3065* (2013.01); *H04L 65/00* (2013.01); *H04M 3/42306* (2013.01); *H04M 7/128* (2013.01); *H04Q 2213/13097* (2013.01)

(58) Field of Classification Search
CPC ............... H04L 45/3065; H04L 65/00; H04M 3/42102; H04M 3/42306; H04M 7/128; H04Q 3/62; H04Q 3/66
See application file for complete search history.

(56) References Cited

U.S. PATENT DOCUMENTS

| | | | |
|---|---|---|---|
| 6,584,093 B1* | 6/2003 | Salama | H04L 12/2856 370/351 |
| 2002/0122547 A1* | 9/2002 | Hinchey | H04M 7/006 379/221.01 |
| 2008/0239968 A1* | 10/2008 | Olsen | H04L 29/1216 370/241 |
| 2010/0203874 A1* | 8/2010 | Scott | H04M 1/274516 455/415 |
| 2015/0103997 A1* | 4/2015 | Wawrzynowicz | H04M 3/5166 379/265.13 |
| 2016/0321353 A1* | 11/2016 | Chen | G06F 17/211 |

* cited by examiner

*Primary Examiner* — Asad M Nawaz
*Assistant Examiner* — Zhaohui Yang

(57) ABSTRACT

Technologies for routing an outbound telecommunication from an enterprise telecommunications device to a destination telecommunications device in a contact identification system are disclosed. The system determines the classification of a dialed address using a number plan that may be created by a user from a plurality of predetermined match types. Once the classification of the dialed address is determined, the system routes the outbound telecommunication on a routing path chosen for that classification of telecommunication. Additional embodiments are described herein.

10 Claims, 3 Drawing Sheets

SYSTEM AND METHOD FOR CONTACT IDENTIFICATION

CROSS-REFERENCE TO RELATED APPLICATIONS

The present application is a U.S. Non-Provisional Utility patent application, which claims priority to U.S. Provisional Patent Application Ser. No. 62/374,138, filed Aug. 12, 2016, which application is incorporated in its entirety, by reference herein.

TECHNICAL FIELD

This patent application relates to computerized systems and methods for communication routing.

BACKGROUND

Current telecommunication systems generally analyze all outbound telecommunications from an enterprise using a fixed classification scheme to determine how each of the telecommunications should be routed. Improvements may therefore be desirable.

SUMMARY

The present application discloses a plurality of embodiments directed to computerized systems and methods for communication routing.

In one embodiment, a method for routing an outbound telecommunication from an enterprise telecommunications device to a destination telecommunications device in a contact identification system is disclosed, the method comprising: receiving, by the contact identification system, a dialed address of the outbound telecommunication from the enterprise telecommunications device; identifying, by a contact identification computing device of the contact identification system, at least one number plan to use to determine a classification of the dialed address, wherein the number plan comprises at least one match type selected from a plurality of match types stored in the contact identification system; determining, by the contact identification computing device, the classification of the dialed address using the at least one number plan; determining, by the contact identification computing device, a selected routing path for the outbound communication from a plurality of available routing paths using at least the determined classification; and routing, by the contact identification computing device, the outbound telecommunication to the destination telecommunications device via the selected routing path.

In another embodiment, a contact identification system for routing an outbound telecommunication from an enterprise telecommunications device over a telecommunications network to a destination telecommunications device is disclosed, the system comprising: a contact identification computing device operatively coupled to the telecommunications network and operative to receive a dialed address of the outbound telecommunication from the enterprise telecommunications device, the contact identification computing device comprising: a number plan database; a match type database; a contact identification module operative to: identify at least one number plan stored in the number plan database to use to determine a classification of the dialed address, wherein the number plan comprises at least one match type selected from a plurality of match types stored in the match type database; and determine the classification of the dialed address using the at least one number plan; and a telecommunication routing module operative to: determine a selected routing path for the outbound communication from a plurality of available routing paths using at least the determined classification; and route the outbound telecommunication to the destination telecommunications device via the selected routing path.

Other embodiments are also disclosed.

BRIEF DESCRIPTION OF DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION

Figure 1:
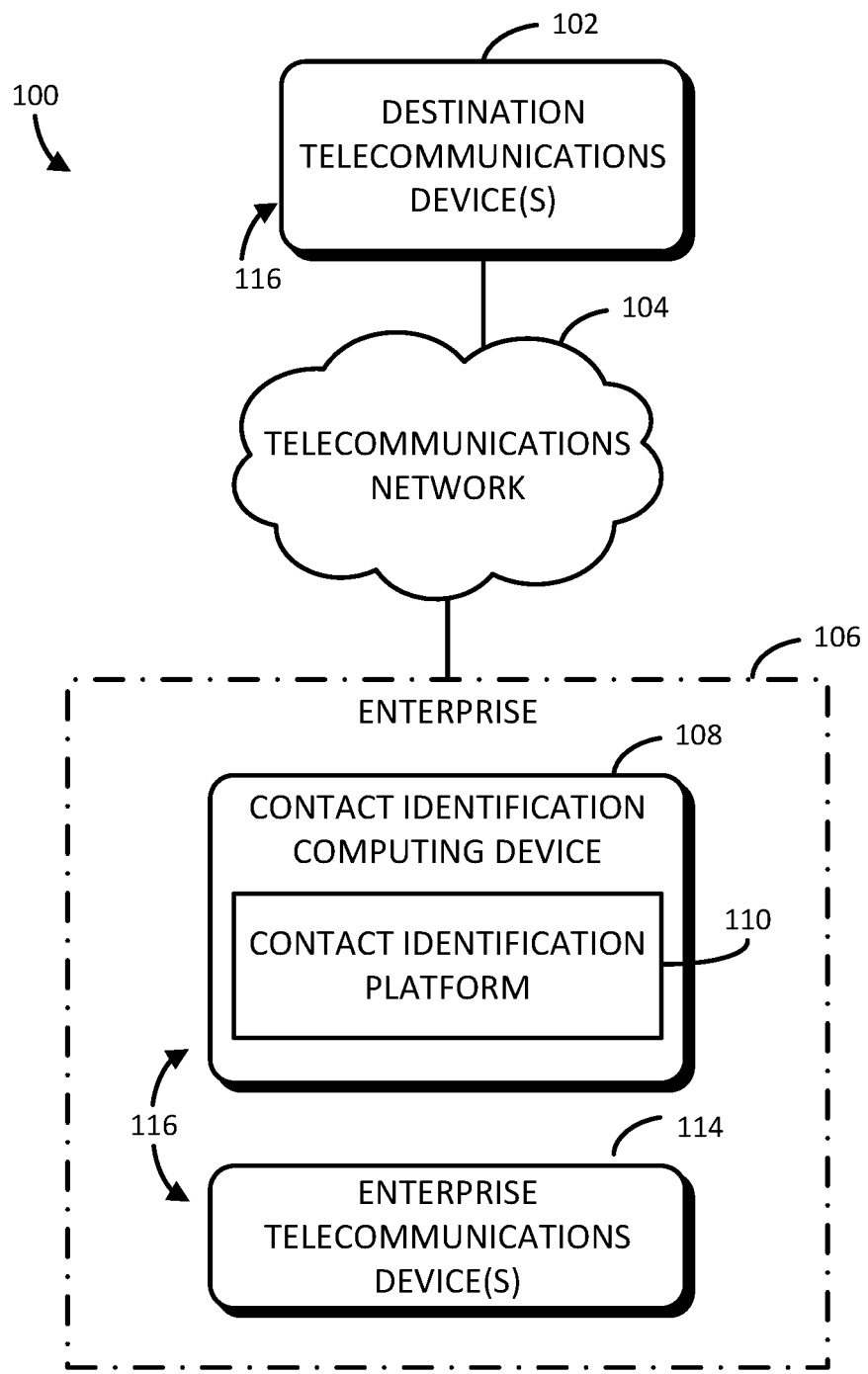
FIG. 1 is a simplified block diagram of an illustrative embodiment for classifying dialed addresses which is illustratively shown in a contact identification system that includes contact identification computing device and one or more enterprise telecommunications devices.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

This detailed description is presented in terms of programs, data structures or procedures executed on a computer or network of computers. The software programs implemented by the system 100 may be written in any programming language—interpreted, compiled, or otherwise. These languages may include, but are not limited to, Xcode, iOS, cocoa, cocoa touch, MacRuby, PHP, ASP.net, HTML, HTML5, Ruby, Perl, Ember.js, Java, Python, C++, C#, JavaScript, and/or the Go programming language. It should be appreciated, of course, that one of skill in the art will appreciate that other languages may be used instead, or in combination with the foregoing and that web and/or mobile application frameworks may also be used, such as, for example, Ember.js, Ruby on Rails, Node.js, Zend, Symfony, Revel, Django, Struts, Spring, Play, Jo, Twitter Bootstrap and others. It should further be appreciated that the systems and methods disclosed herein may be embodied in software-as-a-service available over a computer network, such as, for example, the Internet. Further, the present disclosure may enable web services, application programming interfaces and/or service-oriented architecture through one or more application programming interfaces or otherwise.

FIG. 1 is an illustrative telecommunications call management system 100 for managing outbound telecommunications from an enterprise, which is illustratively shown as including one or more destination telecommunications devices 102 communicatively coupled to an enterprise 106 via a telecommunications network 104. The illustrative enterprise 106 includes contact identification computing device 108 and one or more enterprise telecommunications devices 114. In an illustrative example, a member of enterprise 106 initiates a telecommunication (e.g., via a respective one of the enterprise telecommunications devices 114) in an effort to contact one of the destination telecommunications devices 102 or another one of the enterprise telecommunications devices 114. Within the enterprise 106, the telecommunication is examined by the contact identification computing device 108. In some embodiments, contact identification computing device 108 may be associated with, or integral to, a telecommunication routing system of the enterprise 106, such as a private branch exchange, a Session Initiation Protocol (SIP) proxy server, an outbound gateway, a cloud managed telephony network appliance, etc.

Upon receipt of the telecommunication, the contact identification computing device 108, or more particularly, the contact identification platform 110 of the contact identification computing device 108, is configured to determine a routing of the telecommunication to a destination telecommunications device 102 (e.g., via the telecommunications network 104) or to another of the enterprise telecommunications devices 114 within the enterprise. If the telecommunication is destined for another of the enterprise telecommunications devices 114 within the enterprise, the contact identification platform 110 of the contact identification computing device 108 causes the telecommunication to be routed within the enterprise 106 without the use of the telecommunications network 104. If the telecommunication is destined for a destination telecommunications device 102, the contact identification platform 110 of the contact identification computing device 108 determines which of the available trunks of the telecommunications network 104 to utilize for the outbound telecommunication.

As described previously, the enterprise 106 illustratively includes the contact identification computing device 108 and the enterprise telecommunications device(s) 114. It should be appreciated that the enterprise 106 may be comprised of any number of compute/storage servers, as well as other network devices (e.g., switches, hubs, routers, access points, etc.), which may be housed in a data center, for example. It should be further appreciated that, in other embodiments, the illustrative contact identification computing device 108 and/or one or more of the enterprise telecommunications device(s) 114 may not be located in the enterprise 106, but instead in a location such as in a remote cloud infrastructure.

In some embodiments, the destination telecommunications device(s) 102, the contact identification computing device 108, and the enterprise telecommunications device(s) 114 may each be embodied as any type of computing device 116 capable of performing the respective functions described herein. For example, in some embodiments, one or more of the destination telecommunications devices 102 and the enterprise telecommunications devices 114 may be embodied as desktop computers or mobile computing devices (e.g., smartphones, wearables, tablets, laptops, notebooks, etc.). In furtherance of the example, in some embodiments, the contact identification computing device 108 may be embodied as one or more servers (e.g., stand-alone, rack-mounted, etc.), compute devices, storage devices, and/or combination of compute blades and data storage devices (e.g., of a storage area network (SAN)) in a cloud architected network or data center.

Additionally, it should be appreciated that each of the contact identification computing device 108 and the enterprise telecommunications device(s) 114, while illustratively shown as single computing devices 116, may be comprised of more than one computing device 116 in other embodiments (e.g., in a distributed computing architecture), each of which may be usable to perform at least a portion of the functions described herein of the respective computing device 116. In an illustrative example, one or more functions of the contact identification computing device 108 may be executed on one or more computing devices 116, while one or more same, additional, or alternative functions of the contact identification computing device 108 may be executed on one or more other computing devices 116.

Figure 2:
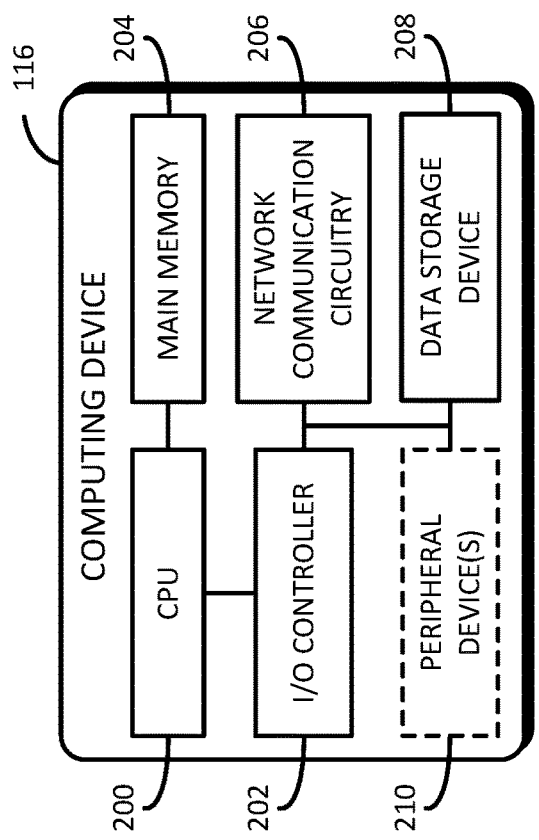
FIG. 2 is a simplified block diagram of an illustrative embodiment of at least one of the computing devices of the system of FIG. 1.

Referring now to FIG. 2, an illustrative computing device 116 (e.g., one of the destination telecommunications devices 102, the contact identification computing device 108 and the enterprise telecommunications devices 114) includes, in some embodiments, a central processing unit (CPU) 200, an input/output (I/O) controller 202, a main memory 204, network communication circuitry 206, a data storage device 208, and, in some embodiments, one or more I/O peripherals 210. In some alternative embodiments, the computing device 116 may include additional, fewer, and/or alternative components to those of the illustrative computing device 116, such as a graphics processing unit (GPU). It should be appreciated that one or more of the illustrative components may be combined on a single system-on-a-chip (SoC) on a single integrated circuit (IC).

Additionally, it should be appreciated that the type of components and/or hardware/software resources of the respective computing device 116 may be predicated upon the type and intended use of the respective computing device 116. For example, the contact identification computing device 108 may not include any peripheral devices 210. Additionally, as described previously, the contact identification computing device 108 may be comprised of more than one computing device 116. Accordingly, in such embodiments, it should be further appreciated that one or more computing devices 116 of the contact identification computing device 108 may be configured as a database server with less compute capacity and more storage capacity relative to another of the computing devices 116 of the contact identification computing device 108. Similarly, one or more other computing devices 116 of the contact identification computing device 108 may be configured as an application server with more compute capacity and less storage capacity relative to another of the computing devices 116 of the contact identification computing device 108.

The CPU 200, or processor, may be embodied as any combination of hardware and circuitry capable of processing data. In some embodiments, the computing device 116 may include more than one CPU 200. Depending on the embodiment, the CPU 200 may include one processing core (not shown), such as in a single-core processor architecture, or multiple processing cores, such as in a multi-core processor architecture. Irrespective of the number of processing cores and CPUs 200, the CPU 200 is capable of reading and executing program instructions. In some embodiments, the CPU 200 may include cache memory (not shown) that may be integrated directly with the CPU 200 or placed on a separate chip with a separate interconnect to the CPU 200. It should be appreciated that, in some embodiments, pipeline logic may be used to perform software and/or hardware operations (e.g., network traffic processing operations), rather than commands issued to/from the CPU 200.

The I/O controller 202, or I/O interface, may be embodied as any type of computer hardware or combination of circuitry capable of interfacing between input/output devices and the computing device 116. Illustratively, the I/O controller 202 is configured to receive input/output requests from the CPU 200, and send control signals to the respective input/output devices, thereby managing the data flow to/from the computing device 116.

The memory 204 may be embodied as any type of computer hardware or combination of circuitry capable of holding data and instructions for processing. Such memory 204 may be referred to as main or primary memory. It should be appreciated that, in some embodiments, one or more components of the computing device 116 may have direct access to memory, such that certain data may be stored via direct memory access (DMA) independently of the CPU 200.

The network communication circuitry 206 may be embodied as any type of computer hardware or combination of circuitry capable of managing network interfacing communications (e.g., messages, datagrams, packets, etc.) via wireless and/or wired communication modes. Accordingly, in some embodiments, the network communication circuitry 206 may include a network interface controller (NIC) capable of being configured to connect the computing device 116 to a computer network, as well as other devices, depending on the embodiment.

The data storage device 208 may be embodied as any type of computer hardware capable of the non-volatile storage of data (e.g., semiconductor storage media, magnetic storage media, optical storage media, etc.). Such data storage devices 208 are commonly referred to as auxiliary or secondary storage, and are typically used to store a large amount of data relative to the memory 204 described above.

The I/O peripherals 210 may be embodied as any type of auxiliary device configured to connect to and communicate with the computing device 116. Depending on the embodiment, the one or more I/O peripherals 210 may include a display, a microphone, a speaker, a mouse, a keyboard, a touchscreen, a camera, a printer, a scanner, etc. Accordingly, it should be appreciated that some I/O devices are capable of one function (i.e., input or output), or both functions (i.e., input and output).

In some embodiments, the I/O peripherals 210 may be connected to the computing device 116 via a cable (e.g., a ribbon cable, a wire, a universal serial bus (USB) cable, a high-definition multimedia interface (HDMI) cable, etc.) connected to a corresponding port (not shown) of the computing device 116 through which the communications made therebetween can be managed by the I/O controller 202. In alternative embodiments, the I/O peripherals 210 may be connected to the computing device 116 via a wireless mode of communication (e.g., Bluetooth®, Wi-Fi®, etc.) which may be managed by the network communication circuitry 206.

Referring back to FIG. 1, as noted previously, the destination telecommunications devices 102 are communicatively coupled to the enterprise 106 via the telecommunications network 104. The telecommunications network 104 may be implemented as any type of wired and/or wireless network, including a public switched telephone network (PSTN), a local area network (LAN), a wide area network (WAN), a global network (the Internet), etc. Accordingly, the telecommunications network 104 may include one or more communicatively coupled network computing devices (not shown) for facilitating the flow and/or processing of network communication traffic via a series of wired and/or wireless interconnects. Such network computing devices may include, but are not limited, to one or more access points, routers, switches, servers, compute devices, storage devices, etc. It should be appreciated that the destination telecommunications devices 102 and the enterprise 106 may use different networks (e.g., PSTNs, LANs, provider networks, etc.) to connect to the backbone of the telecommunications network 104 such that a number of communication channels can be established therein to enable communications therebetween.

Figure 3:
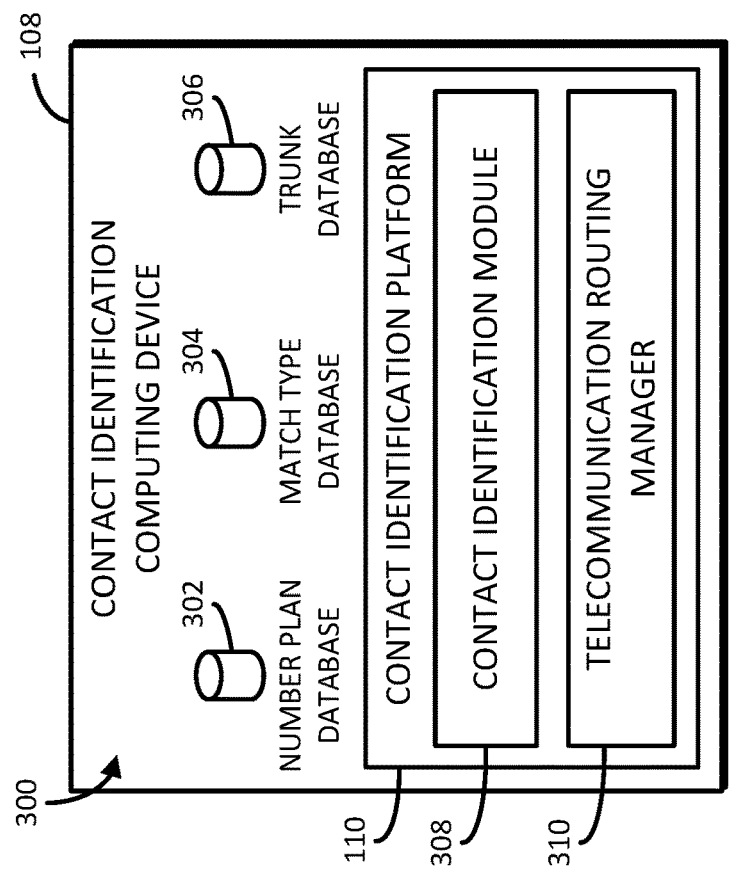
FIG. 3 is a simplified block diagram of an illustrative embodiment of an environment of the contact identification computing device of FIG. 1.

Referring now to FIG. 3, an illustrative environment 300 of the contact identification computing device 108 includes the contact identification platform 110, which may be embodied as any combination of hardware, firmware, software, or circuitry usable to perform the functions described herein. Further, the contact identification platform 110 includes or otherwise has access to one or more computer-readable medium (e.g., the memory 204, the data storage device 208, and/or any other media storage device) having instructions stored thereon and one or more processors (e.g., the CPU 200) coupled with the one or more computer-readable medium and configured to execute instructions to perform the functions described herein. While the functionality of the contact identification platform 110 may be described herein as being performed by a particular component or set of components, it should be appreciated that, in other embodiments, the contact identification platform 110 may include additional and/or alternative components for performing the functions described herein.

The illustrative environment 300 includes a number plan database 302, a match type database 304, and a trunk database 306. It should be appreciated that, in some embodiments, the data stored in the respective databases as described herein may not be mutually exclusive. In other words, certain data described herein as being stored in one database may additionally or alternatively be stored in another database described herein, or another database altogether. It should be further appreciated that, in some embodiments, the data may be stored in a single database, or an alternative database/data storage arrangement.

Additionally, the illustrative databases described herein may be combined or further segregated, in other embodiments. In some embodiments, access to the data provided to and/or generated as described herein may require authorization and/or that such data be encrypted while in storage and/or transit. Accordingly, in such embodiments, one or more authentication and/or encryption technologies known to those of skill in the art may be employed to ensure the storage and access to the data complies with any legal and/or contractual requirements.

The illustrative contact identification platform 110 includes a contact identification module 308 and a telecommunication routing manager 310. The contact identification module 308 is configured to receive information regarding a dialed address origination from the enterprise telecommunications device(s) 114 and to analyze the dialed address in accordance with one or more number plans stored in the number plan data base 302. The number plans stored in the number plan database 302 may be created by a user using one or more match types, as explained in greater detail hereinbelow. In some embodiments, the match type information may be stored in the match type database 304.

The telecommunication routing manager 310 is configured to receive the dialed address and the number plan analysis results (i.e., the determined classification) from the contact identification module 308. Telecommunication routing manager 310 uses this information and information stored in the trunk database 306 to route the outbound telecommunication either internally or to one of the trunks of the telecommunications network 104. The trunk database 306 may store, for example, the identification of which trunks outbound communications should be roted to depending upon the type of dialed address.

The contact identification computing device 108, and more particularly the telecommunication routing manager 310, may be programmed to route different types of outbound telecommunications to different ones of the available trunks. For example, it may be more cost effective for an enterprise 106 to send international telecommunications through a different trunk than national telecommunications due to rates charged by different telephony trunk providers.

In order to identify to which of the available outbound trunks the telecommunication should be routed, the systems and methods of the present disclosure are operative to analyze outbound telecommunications (e.g., dialed phone number, SIP address, etc.), using predetermined rules in order to classify the outbound telecommunication. The predetermined rules may comprise a plurality of match types stored within the match type database 304. A match type comprises a plurality of ways to classify a dialed address (e.g., dialed phone number, SIP address, etc.). Examples of match types comprise "regular expression", "number list", "digit length", "intra-country", etc. Match types may be used to simplify the outbound telecommunication classification process and provide a greater ease of use to a user.

If the match type "regular expression" is selected by the user, then the dialed address is analyzed using a regular expression pattern match. Regular expressions use a combination of standard and meta-characters to create a pattern against which to match a specific string. The system compares a regular expression to a string of characters (the dialed address) to determine if the string of characters matches the pattern described by the regular expression. The answer is either yes or no. Sometimes a yes is called a positive match and a no is called a negative match.

If the match type "number list" is selected by the user, then classification matches may be made against predetermined numbers in a list. For example, the number "911" could be classified as "Emergency" or "411" might be classified as "Information", etc.

If the match type "digit length" is selected by the user, the user would only have to select a desired length and any number dialed of that length will be declared a match. For example, most organizations have internal extensions that are a shorter number of characters in length than dialed addresses of destination telecommunications devices 116 located external to the enterprise 106. For example, it is commonplace for an enterprise 106 to have internal extensions between three and five digits in length. If a digit length of four has been selected, if the dialed address comprises 4 digits, the contact identification computing device 108 may classify the dialed address as an internal extension and route the telecommunication internally within the enterprise 106.

In another example, if a user selects "intra-country" as the match type, then any number dialed that has the caller's originating site's country code as the country code on the dialed number will trigger a match.

In another example, a full E.164 number (including country code) might be used. The international public telecommunication numbering plan (E.164) defines a numbering plan for the world-wide public switched telephone network (PSTN) and some other data networks. E.164 defines a general format for international telephone numbers. Plan-conforming numbers are limited to a maximum of 15 digits, excluding the international call prefix. This allows the system to determine if a communication is national or international based on the country code in the number. It may be more cost effective for an organization to send international communications through a different trunk than national communications due to deals/rates with their telephony trunk providers.

As previously discussed, in some embodiments, the contact identification computing device 108 may be associated with, or integral to, a telecommunication routing system of the enterprise 106, such as a private branch exchange, a Session Initiation Protocol (SIP) proxy server, an outbound gateway, a cloud managed telephony network appliance, etc. In an embodiment, match types may be used for voice calls (e.g., public switched telephone network (PSTN) calls, SIP calls, voice over internet protocol (VOIP) calls, etc.). A user setting up the routing rules of the contact identification computing device 108 may create number plans using any of the predetermined match types to identify calls that should be routed to a particular trunk of the telecommunications network 104 or internally within the enterprise 106. A number plan comprises the specific match type selected for analyzing the dialed address. For example, the match type "digit length" might be selected, but from this, a number plan called "extensions" using match type "digit length" with an input of "4" may be created to internally route any dialed address that is only 4 characters in length.

When an outbound telecommunication is sent to the contact identification computing device 108, the device 108 iterates over the predetermined number plans and attempts to match the dialed address based on the match type selected by the user for the number plan (using as data supplied specifically for that number plan or data stored on the contact identification device 108's site or location). If matched, then that number plan's classification is used by the contact identification computing device 108 to determine how the telecommunication should be routed. If there is no match, the communication may be dropped or disconnected.

Figure 4:
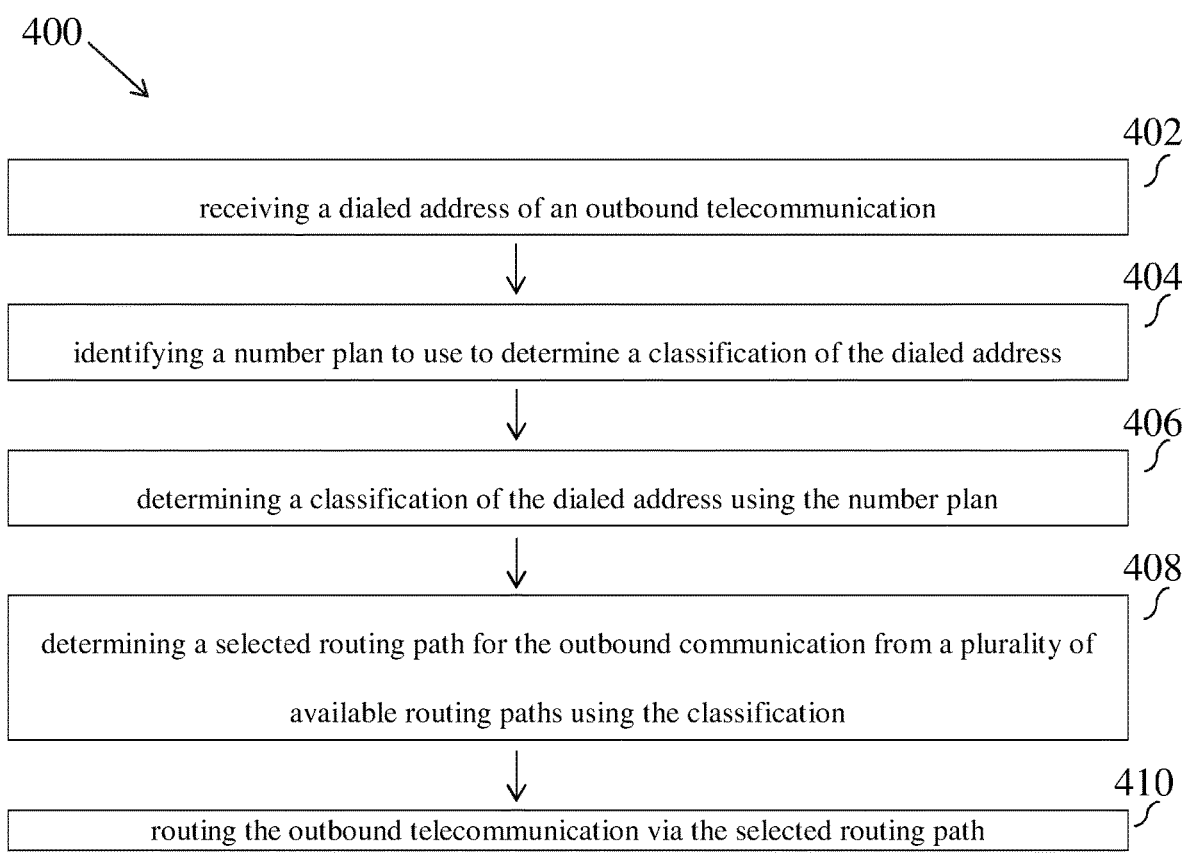
FIG. 4 is a simplified flow diagram of an illustrative embodiment of a method for classifying dialed addresses that may be executed by the contact identification computing device of FIGS. 1 and 3.

Referring now to FIG. 4, an illustrative method 400 is provided for routing an outbound telecommunication from an enterprise telecommunications device to a destination telecommunications device which may be executed by the contact identification computing device 108, or more particularly the contact identification platform 110 of the contact identification computing device 108. The method 400 begins in block 402, in which the contact identification platform 110, or more particularly the contact identification module 308 of the contact identification platform 110, receives a dialed address from the enterprise telecommunications device. The method 400 then advances to block 404.

In block 404, the contact identification module 308 of the contact identification platform 110 selects at least one number plan to use to determine a classification of the dialed address. As described hereinabove, the number plan may be created by the user of the contact identification system 108 by selecting at least one match type from a plurality of match types stored in the match type database 108 of the contact identification system 108. The method 400 then advances to block 406.

In block 406, the contact identification module 308 of the contact identification platform 110 determines a classification of the dialed address using the selected number plan. The method 400 then advances to block 408.

In block 408, the telecommunication routing manager 310 of the contact identification platform 110 receives the determined classification from the contact identification module 308 and determines a selected routing path for the outbound communication from a plurality of available routing paths using at least the determined classification. The plurality of available routing paths may comprise the available trunks of the telecommunications network 104 and routing paths internal to the enterprise 106. In some embodiments, other information may additionally be used to determine a selected routing path, such as a current capacity of a routing path, to name just one non-limiting example. The method 400 then advances to block 410.

In block 410, the telecommunication routing manager 310 of the contact identification platform 110 routes the outbound telecommunication to the destination telecommunications device 102 via the selected routing path. The method 400 then ends.

While the present disclosure has been illustrated and described in detail in the drawings and foregoing description, the same is to be considered as illustrative and not restrictive in character, it being understood that only certain embodiments have been shown and described, and that all changes and modifications that come within the spirit of the present disclosure are desired to be protected.

What is claimed is:

1. A method for routing an outbound telecommunication from an enterprise telecommunications device to a destination telecommunications device in a contact identification system, the method comprising:
   receiving, by the contact identification system, a dialed address of the outbound telecommunication from the enterprise telecommunications device;
   identifying, by a contact identification computing device of the contact identification system, at least one number plan set up from a user device to use to determine a classification of the dialed address of the outbound telecommunication, wherein the number plan comprises at least one match type selected from a plurality of match types stored in the contact identification system, each of the plurality of match types corresponding to a respective plurality of predetermined rules, wherein the match types comprise a plurality of ways to classify the dialed address;
   determining, by the contact identification computing device, the classification of the dialed address using the at least one number plan;
   determining, by the contact identification computing device, a selected routing path for the outbound telecommunication from a plurality of available routing paths based on the determined classification and a cost-effectiveness comparison between the available routing paths; and
   routing, by the contact identification computing device, the outbound telecommunication to the destination telecommunications device via the selected routing path.

2. The method of claim 1, wherein the dialed address corresponds to an international address.

3. The method of claim 2, wherein the selected routing path corresponds to a trunk having a lower cost than other ones of the available routing paths.

4. The method of claim 1, wherein the selected routing path is further determined based on a current capacity of the available routing paths.

5. The method of claim 1, wherein the plurality of ways to classify the dialed address comprise at least one of a regular expression, a number list, a digit length, intra-country, or international.

6. A contact identification system for routing an outbound telecommunication from an enterprise telecommunications device over a telecommunications network to a destination telecommunications device, the system comprising:
   a processor; and
   a memory coupled to the processor, wherein the memory stores instructions that, when executed by the processor, cause the processor to:
      receive a dialed address of the outbound telecommunication from the enterprise telecommunications device;
      identify at least one number plan set up from a user device to use to determine a classification of the dialed address of the outbound communication, wherein the number plan comprises at least one match type selected from a plurality of match types stored in the contact identification system, each of the plurality of match types corresponding to a respective plurality of predetermined rules, wherein the match types comprise a plurality of ways to classify the dialed address;
      determine the classification of the dialed address using the at least one number plan;
      determine a selected routing path for the outbound telecommunication from a plurality of available routing paths based on the determined classification and a cost-effectiveness comparison between the available routing paths; and
      route the outbound telecommunication to the destination telecommunications device via the selected routing path.

7. The system of claim 6, wherein the dialed address corresponds to an international address.

8. The system of claim 7, wherein the selected routing path corresponds to a trunk having a lower cost than other ones of the available routing paths.

9. The system of claim 6, wherein the selected routing path is further determined based on a current capacity of the available routing paths.

10. The system of claim 6, wherein the plurality of ways to classify the dialed address comprise at least one of a regular expression, a number list, a digit length, intra-country, or international.

* * * * *